April 29, 1924.
H. J. J. M. DE R. DE BELLESCIZE
1,492,321
RADIO SIGNALING SYSTEM
Filed Aug. 29, 1921
Fig. 1
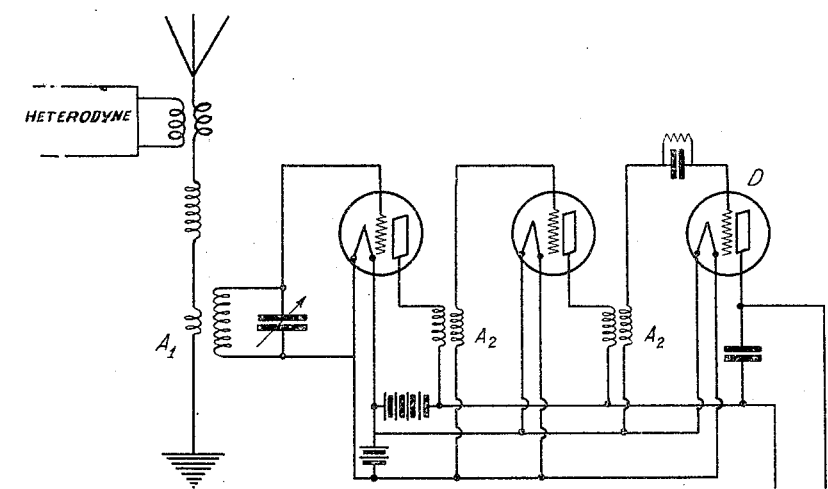
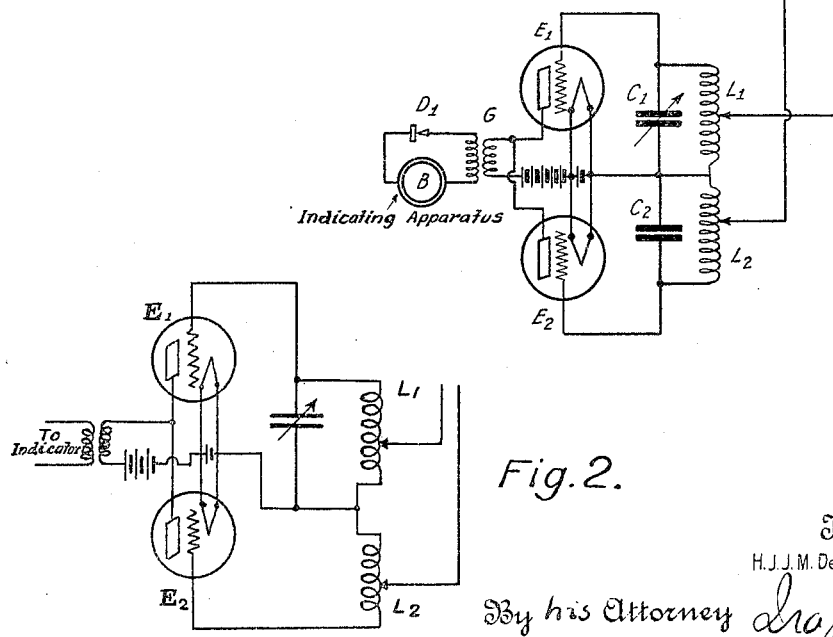
Fig. 2.
Inventor
H.J.J.M. DeR. DeBELLESCIZE
By his Attorney Patented Apr. 29, 1924.

1,492,321

UNITED STATES PATENT OFFICE.

HENRI JEAN JOSEPH MARIE DE REGNAULD DE BELLESCIZE, OF TOULON, FRANCE.

RADIO SIGNALING SYSTEM.

Application filed August 29, 1921. Serial No. 496,535.

(GRANTED UNDER THE PROVISIONS OF THE ACT OF MARCH 3, 1921, 41 STAT. L., 1313.)

*To all whom it may concern:*

Be it known that I, HENRI JEAN JOSEPH MARIE DE REGNAULD DE BELLESCIZE, a citizen of France, and a resident of Toulon, France, have invented certain new and useful Improvements in Radio Signaling Systems (for which I have filed an application in France March 9, 1920) of which the following is a specification, accompanied by drawings.

The present invention relates to improvements in apparatus for eliminating interference and particularly to an improvement over the invention described in my application Serial No. 496,534, filed August 29, 1921 for wireless telegraph and telephone receivers.

The receiving circuit arrangement forming the object of the present invention comprises two low frequency resonators $L_1$, $C_1$; $L_2$, $C_2$, energized by the current issuing from the detector D, and differentially actuating, e. g., by means of three-electrode tubes $E_1$ and $E_2$ serving as relays, one and the same indicating apparatus B. No special conditions are required for this indicator. It is assumed that the signal is modulated to a well-defined frequency, either by the construction of the sending station, or by an autodyne or heterodyne circuit arrangement at the receiving end. One of these two low frequency resonators, e. g., $L_1$ $C_1$, is tuned to the modulating frequency.

Such differential circuit arrangement cannot function properly unless the disturbing current to be eliminated possesses after passage through the detector, small strengthening and weakening time constants with respect to the periods of the low frequency resonators. This condition may be readily realized.

On one hand, the characteristics of the high frequency receiving circuits usually determine the form of the disturbing current obtained by rectification in the detector of the free oscillation generated by the impulse of the atmospheric on the high frequency receiving circuits. For instance, if the receiver comprises an antenna having a damping factor $\alpha$, and a secondary having a damping factor $\beta$, the form of the rectified disturbing current is determined by the expression $$e^{-\alpha t} - e^{-\beta t}$$

On the other hand, the period $T_1$ which is common to the low frequency modulation and to the resonator $L_1$ $C_1$, may also be modified, either by the construction of the transmitter or by the tuning of the heterodyne or autodyne.

Having at our disposal $T_1$, $\alpha$, $\beta$ . . . , the relations $$\frac{\pi}{\frac{1}{\alpha}}, \frac{\pi}{\frac{1}{\beta}}$$

may be made as large as necessary. For practical purposes, a relation of about 5 is sufficient for the rectified disturbing current to act as a sudden shock in the low frequency circuit and be propagated there without deformation, and be annuled there as a result of the opposition of these circuits.

Having thus summed up the principles of our circuit arrangement and its utilization, a few additional features will be described. Certain of these features result from arrangements already discussed, and are given only for the purpose of explaining the invention. Other features are for the purpose of adapting the differential circuit arrangement to such uses as high speed telegraphy with very long waves, for which the already disclosed arrangements are not always sufficient.

My invention is illustrated in the accompanying drawing in which—

Fig. 1 represents diagrammatically a complete system according to my invention, and Fig. 2 represents a portion thereof slightly modified.

One feature relates to the use of the heterodyne or autodyne circuit arrangement for modulating the amplitude of the signals received, this use being mentioned in the application. It should be noted, however, that by means of the arrangements the necessity of which has already been pointed out, the free oscillation generated in the high frequency circuit by the atmospheric impulse is not subject to any modulation. In view of the smallness of the time constants $$\frac{1}{\alpha}, \frac{1}{\beta}$$

with respect to the period $T_1$ of the modulation, the total length of the free train is too short for generating a single complete beat by interference with the heterodyne. The disturbing current that is rectified by the detector might be slightly deformed, nevertheless, it will act as a short and a periodic shock on each one of the low frequency differential circuits. Therefore, in the present arrangement the use of the heterodyne does not cause any noticeable disadvantages whereby its well known advantages would be reduced, i. e., the modulation of the signal and the improved operation of the detector.

A second feature relates to the arrangement of the differential circuits. As stated, one of the two low frequency circuits (e. g., $L_2$, $C_2$) must be detuned with respect to the modulation period $T_1$. A good result may be obtained also by annulling the capacity $C_2$ as shown in Fig. 2 so as to render this circuit completely aperiodic. In this case, it is advisable to give the circuit a time constant $L^2/R^2$ which is high with respect to the time constants characterizing the disturbance issuing from the detector.

Third, the rectified disturbances arriving in the differential protecting system possess dampings that at the most are equal to the time constants of the damped oscillating train generated in the antenna by the atmospheric impulse. It will be pointed out why this holds good for most of the usual circuits and the precautions will be described that must be taken if this condition, that is indispensable to the proper operation of our arrangement, does not occur by itself.

In the following description, we will designate by:

T the high frequency oscillation period; $T_1$ the period of the modulation; $\omega$ the pulsation of the high frequency oscillations; $\alpha$, $\beta$ ... the damping factors of the high frequency resonators; $\gamma$, $\delta$ ... their decrements.

If in the usual manner, the antenna and the resonators are slightly damped, the pulsation $\omega$ is considerably greater than the damping factors $\alpha$, $\beta$ .... This is arrived at from the well known relations:

$$\omega = \frac{2\pi}{\gamma}, \alpha = \frac{2\pi}{\delta} \beta \ldots$$

for example, if $\delta$, $\zeta$ are of the tenth order, $$\frac{\omega}{\alpha} \frac{\omega}{\beta}$$

are of the order of 60. Under these conditions, an atmospheric shock having time constants of the order of $\frac{1}{\alpha}$ (or a fortiori greater than $\frac{1}{\alpha}$), cannot be propagated in its primitive form in the high frequency resonators. It generates there two superposed currents; one, substantially reproducing the initial form of the atmospheric, becomes weaker in the antenna with respect to the signal, the proportion between the two being approximately $$\left(\frac{\gamma}{2\pi}\right)^3 \left(\frac{1}{60}\right)^3,$$

in the above assumed case. At each supplementary resonance stage (secondary, tertiary, resonators of the amplifier) an analogous new damping occurs, whereby the first disturbing component characterized by relatively high time constants, practically does not reach the detector and the protecting arrangement. The other component is the free oscillation developed by the atmospheric impulse. It is built up and extinguished with the time constants of the high frequency resonators and under the above conditions, insures the proper functioning of the protecting circuit. It will be seen therefore that with usual circuits and operating conditions, no supplementary arrangements are necessary.

However, the conditions might change in case waves of great length were used or messages were sent at great speed. In order to keep the signals separate and distinct, the modulation period $T_1$ must be reduced. On the other hand, the principle of the present invention consists in leaving a sufficient relation (in practice at least 5) between $T_1$ and the time constants of the high frequency resonators. These constants will be very small and will be reduced until they will be of the order of the value of period T. On the other hand, the corresponding dampings $$\frac{1}{\alpha}, \frac{1}{\beta}$$

will be relatively high. For example, in order to transmit with a wave of 20,000 metres $$(T = \frac{1}{15,000} \text{ second})$$

signals produced at the speed of 150 words per minute, we would have to adopt $$T_1 = \frac{1}{2,000} \text{ second}, \frac{1}{\alpha}, \frac{1}{\beta}$$

will by construction be made inferior to $$\frac{1}{10,000} \text{ second}, \gamma, \delta$$

will be of the order of 0.7. Under these conditions it might happen that, if no special provisions are made, the atmospheric disturbances of relatively long duration with respect to $$\frac{1}{\alpha} \frac{1}{\beta}.$$

T and even $T_1$, will traverse the high frequency circuits in their primitive form and without being subjected to sufficient attenuation. In this case, the low frequency differential circuits will not function properly. In order to avoid this disadvantage, it is advisable always to maintain a sufficiently high relation (e. g., 10) between the modulation period $T_1$ and the high frequency period T, and to arrange the high frequency circuits in a manner to damp the transmission of currents or oscillations having much greater time constants or periods than the period T of the signal to be received. This result may be obtained without special arrangements in the manner shown in the drawing, in which the antenna and the amplifier are of the usual types. By methods well known in the electrical art the transformers $A_1$, $A_2$ are calculated for the frequency T.

In accordance with this more complete disclosure, our arrangement is characterized as follows: The receiver comprises two kinds of circuits, one specially provided for transmitting high frequency oscillations of T period and the other for the modulation period $T_1$.

The relation between the modulation period $T_1$ on one hand, the high frequency period T and the time constants $\frac{1}{\alpha}$, $\frac{1}{\beta}$ of the high frequency circuits on the other hand, must be at least of the order of 10 for $\frac{T_1}{T}$ and of the order of 5 for $$\frac{T_1}{\frac{1}{\alpha}} \quad \frac{T_1}{\frac{1}{\beta}} \ldots$$

The atmospherics characterized by building up and extinguishing time constants that are much superior to $$T \frac{1}{\alpha} \frac{1}{\beta} \ldots$$

are either considerably weakened by the high frequency circuits, or transmitted by them in the form of a freely damped train, the time constants of which are those of these circuits. The other atmospherics reach the detector either substantially in their primitive form, more or less attenuated, or in the form of a free train, the time constants of which are those of the high frequency circuits.

In any case, after preparation in the high frequency circuits and rectification in the detector, the disturbing current characterized by the time constants of the order of $\frac{1}{\alpha}$ $\frac{1}{\beta}$ or T at the most, acts on the differential system as a shock that is very short with respect to the modulation period $T_1$ and will be eliminated in that circuit by the mechanism above referred to.

Fourth, it should be noted that the indicating apparatus B may be connected with the differential protecting system by any well known connecting arrangements used in receiving circuits. Fig. 2 of the application referred to shows an indicator connected with the plate circuit of the differential system, but obviously, any known intermediate systems G would give the same result, provided that they be differentially actuated and without interposition of the detectors, by the two protecting circuits. If necessary, e. g., for the purpose of transforming the modulations of $T_1$ period into direct current, an additional detector $D_1$ could be inserted in the connection between G and the indicator. The differential circuit arrangement forming the object of the preceding application and of the present improvements applies not only to wireless telephony or telegraphy but to all systems in which it is desired to eliminate rapid disturbances of any nature and to permit the propagation only of currents that have a determined period of rhythm.

Having described my invention, what I claim is:

1. A radio signaling system, comprising a high frequency receiving circuit for signals having an audible frequency component and two differential low frequency circuits differently tuned, the period of said audible frequency being much greater than the period of the high frequency oscillations and the time constants of the high frequency circuit.

2. A radio signaling system, comprising an antenna, a high frequency receiving circuit for signals having an audible frequency component and two differential low frequency circuits differently tuned, the period of said audible frequency being much greater than the time constants of said high frequency oscillations and the time constants of the high frequency circuit and antenna.

3. A radio signaling system, comprising an antenna and a high frequency receiving circuit for signals having an audible frequency component the period of said audible frequency being much greater than the period of the high frequency oscillations and the time constants of the high frequency circuit and antenna.

4. A radio signaling system, comprising a high frequency receiving circuit for signals having an audible frequency component and two differentially arranged low frequency receiving circuits differently tuned, having high time constants with respect to the oscillation frequency of said high frequency circuit.

5. A radio signaling system comprising a high frequency receiving circuit for signals having an audible frequency component, a detector circuit and two differentially connected low frequency circuits differently tuned having high time constants with respect to the oscillation frequency and the time constants of the high frequency receiving circuit.

6. A radio signaling system comprising high frequency receiving and amplifying circuits, two low frequency receiving circuits differently tuned, having a portion of their circuits in common and a detector circuit coupled to said common portion.

7. A radio signaling system comprising high frequency receiving and amplifying circuits for signals having an audible frequency component, a low frequency circuit tuned to said audible frequency, a second low frequency circuit, said last mentioned circuit being aperiodic and a detector circuit differentially coupled to said low frequency circuits.

HENRI JEAN JOSEPH MARIE de
REGNAULD de BELLESCISE.